United States Patent
Obata et al.

(10) Patent No.: US 6,411,465 B1
(45) Date of Patent: *Jun. 25, 2002

(54) ROTARY HEAD DRUM ASSEMBLY WITH UPPER, LOWER AND INNER DRUMS WITH CYLINDRICAL SURFACES OF DIFFERING OUTWARD RADIAL POSITION

(75) Inventors: Shigeo Obata, Kobe; Makoto Miyamoto, Sanda; Atsushi Imai, Takatsuki; Yoshinobu Ono, Hirakata; Shinji Tanaka, Kyoto; Hisashi Takahashi, Kagawa; Kenji Kawamata, Saijo, all of (JP)

(73) Assignee: Matsushita Electric Industial Co., Ltd., Kadoma (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/531,587

(22) Filed: Mar. 20, 2000

Related U.S. Application Data (62) Division of application No. 09/163,393, filed on Sep. 30, 1998.

(30) Foreign Application Priority Data

Sep. 30, 1997 (JP) .............................................. 9-265756
Nov. 10, 1997 (JP) .............................................. 9-306870

(51) Int. Cl.⁷ ............................. G11B 15/61; G11B 5/52
(52) U.S. Cl. .................. 360/130.24; 360/84; 360/271.1
(58) Field of Search ....................... 360/130.24, 130.23, 360/130.22, 84, 271–282

(56) References Cited

U.S. PATENT DOCUMENTS

| 3,510,605 | A | * | 5/1970 | Ottens |
| 3,961,369 | A | * | 6/1976 | Baumann et al. |
| 4,257,076 | A | * | 3/1981 | Shimizu et al. |
| 4,891,726 | A | * | 1/1990 | Suwa et al. |
| 5,438,468 | A | * | 8/1995 | Hasegawa et al. |
| 6,091,588 | A | * | 7/2000 | Queau et al. |

FOREIGN PATENT DOCUMENTS

| JP | 59-220858 | * | 12/1984 |
| JP | 62-291714 | * | 12/1987 |
| JP | 03-120659 | * | 5/1991 |
| JP | 04-195756 | * | 7/1992 |
| JP | 05-174458 | * | 7/1993 |
| JP | 05-242440 | * | 9/1993 |
| JP | 07-182742 | * | 7/1995 |
| JP | 07-334897 | * | 12/1995 |
| JP | 08-185654 | * | 7/1996 |
| JP | 09-320153 | * | 12/1997 |

* cited by examiner

Primary Examiner—Craig A. Renner
(74) Attorney, Agent, or Firm—Wenderoth, Lind & Ponack, L.L.P.

(57) ABSTRACT

A rotary head in which the tape running load is decreased by setting the tape path cylindrical surface of an upper drum (12) in a range of winding of a tape (31) at an inner side relative to the tape path cylindrical surface of a lower drum (11). Alternatively, the tape path cylindrical surface of an inner drum (13) in a range of winding of the tape (31) is positioned at an outer side relative to the tape path cylindrical surface of the upper or lower drum.

5 Claims, 11 Drawing Sheets

ROTARY HEAD DRUM ASSEMBLY WITH UPPER, LOWER AND INNER DRUMS WITH CYLINDRICAL SURFACES OF DIFFERING OUTWARD RADIAL POSITION

This is a divisional application of Ser. No. 09/163,393, filed Sep. 30, 1998.

BACKGROUND OF THE INVENTION

1. Field of the Invention

The present invention relates to a rotary head drum of an inner rotary head drum system.

2. Description of Related Art

A cassette type magnetic recording and reproducing apparatus using a rotary head drum is recently reduced in size notably while being enhanced in performance and quality. Its mechanism and rotary head drum are required to be smaller in size, and hence the rotary head drum of an inner rotary head drum system is employed more widely.

Figure 10A:
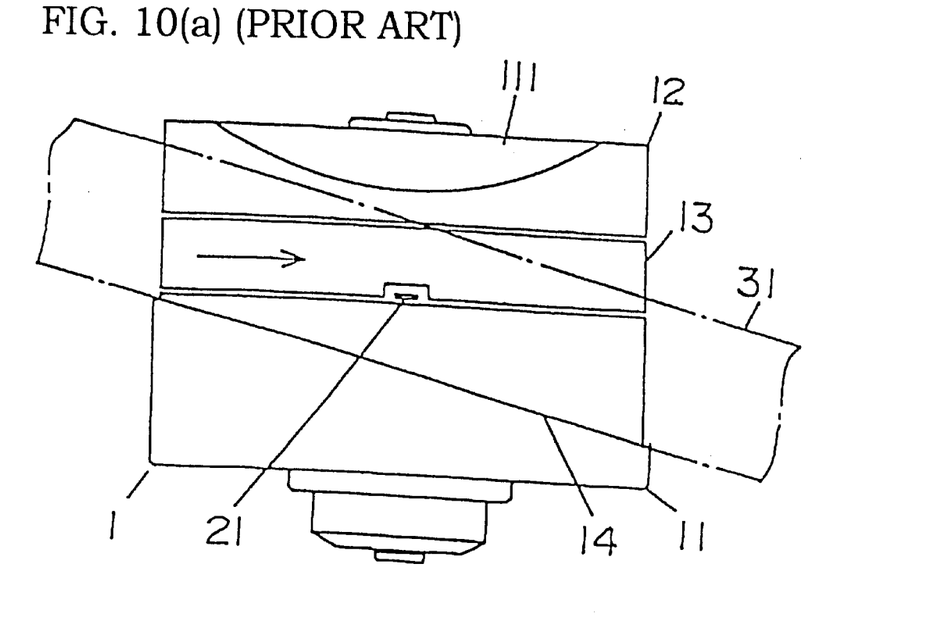
FIG. 10(a) is a side view of a prior art rotary head drum.
Figure 12:
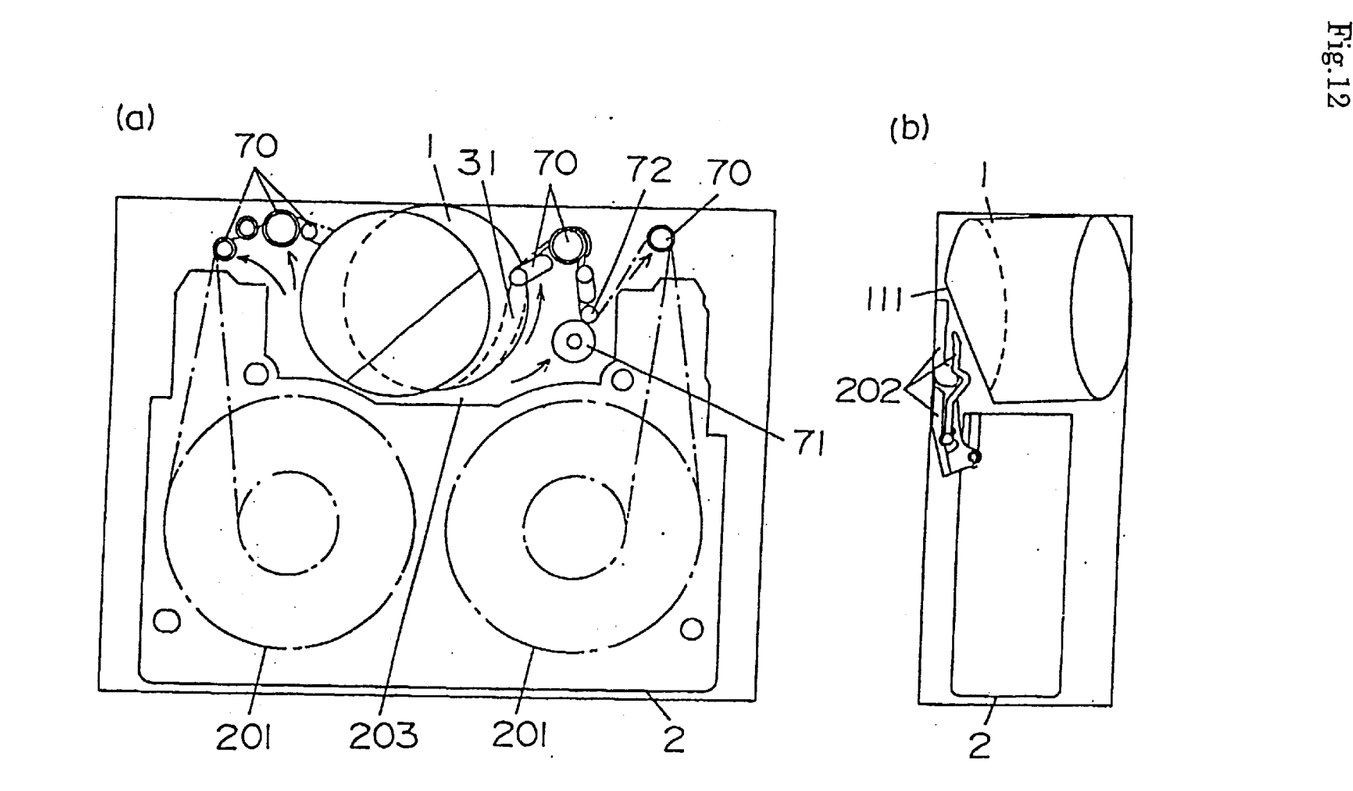
FIG. 12(a) is a plan view showing an outline of a tape path.
FIG. 12(b) is a side view showing the outline of the tape path.

Referring to the drawings, a conventional example of rotary head drum is described below. FIG. 10(a), (b) are side views of a prior art rotary head drum. FIGS. 12(a), (b) are schematic diagrams of the tape path in a magnetic recording and reproducing apparatus, FIG. 12(a) being a plan view and FIG. 12(b) being a side view.

In the tape path shown in FIGS. 12(a), (b), a tape 31 wound on a reel 201 is helically wound around a rotary head drum 1 at a specified lead angle by a specified angle, and it is transferred at a constant speed through collaboration of a pinch roller 71 and a capstan 72 to record and reproduce. A plurality of loading posts 70 are drawn out from a mouth 203 of a cassette 2 for helical winding of the tape 31 around the rotary head drum 1. A specified tension is applied to the tape 31 in the rotary head drum 1.

Herein, in particular, in the case of a portable appliance such as a VTR with a built-in camera, in order to keep the entire appliance compact in size, it is necessary to locate the rotary head drum 1 deeply into the mouth 203 of the cassette 2. However, the cassette 2 is provided with a dust lid 202, and this lid 202 interferes with the upper part of the rotary head drum 1. To prevent this interference, generally, the rotary head drum 1 is moved to a lower side of the mouth 203 so as to depart from the lid 202, but since the rotary head drum 1 projects largely from the lower side of the cassette, the thickness of the appliance is increased. Accordingly, to suppress the thickness of the appliance, a cut portion 111 is formed by cutting off the upper part of the rotary head drum 1 obliquely as shown in FIG. 12(b).

Figure 10B:
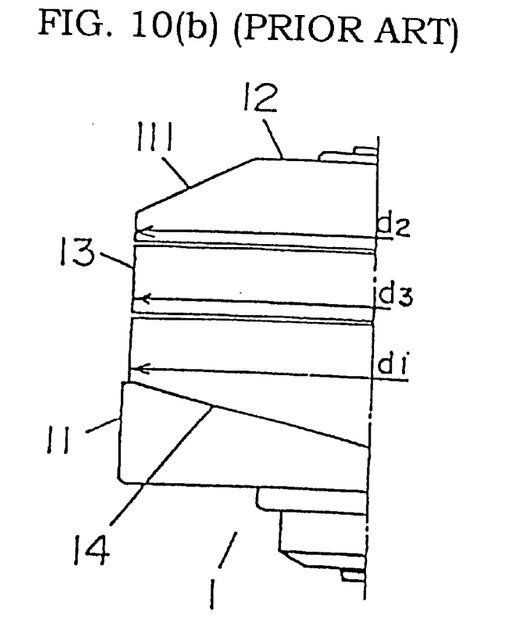
FIG. 10(b) is a side view showing the diameter of each drum of the prior art rotary head drum.

To cut obliquely the upper part of the rotary head drum 1, as shown in FIG. 10, an upper drum 12 is fixed coaxially on a lower drum 11, and an inner drum 13 mounting a head 21 at its lower end is disposed coaxially between the two drums (this is the so-called inner drum rotation constitution). The inner drum 13 is rotatably supported by a shaft and a bearing (not shown). The thickness of the inner drum 13 is about half of the tape 31. The rotating direction is rightward as shown in the drawing.

The lower drum 11 is provided with a lead 14 for guiding the tape path, and the tape 31 runs while contacting with the lead 14 at its lower end. The upper drum 12 has the cut portion 111, and its outer circumference is processed by lathe finishing.

Figure 11A:
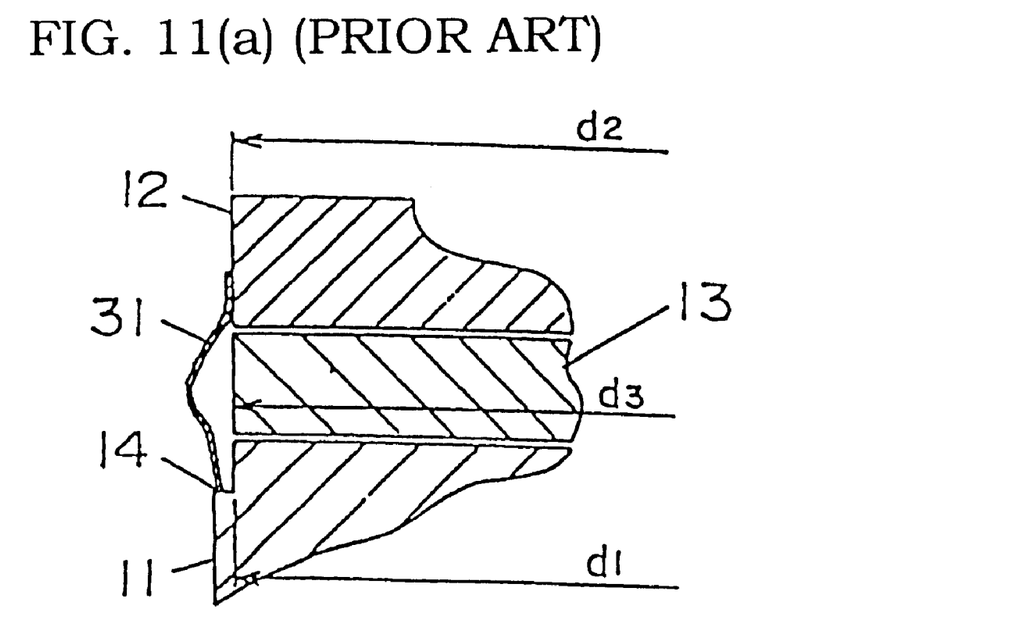
FIG. 11(a) is an explanatory diagram of tape floating condition in relation to upper, inner, and lower drums of the prior art rotary head drum.
Figure 11B:
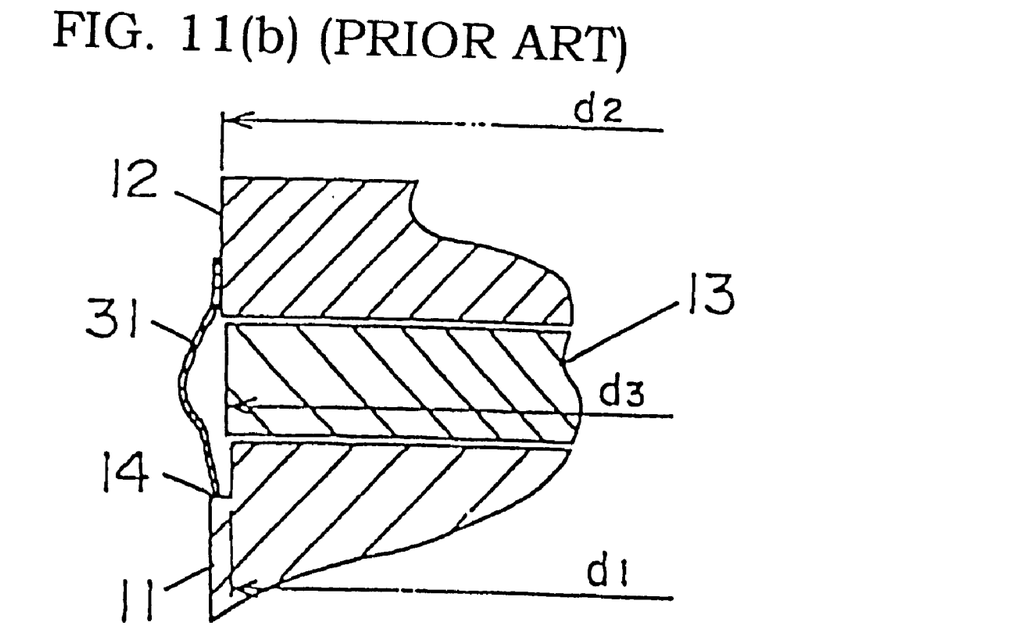
FIG. 11(b) is an explanatory diagram of tape floating condition in relation to upper, inner, and lower drums in another prior art rotary head drum.

Conventionally, as shown in FIGS. 11(a), (b), the diameters d1, d2, d3 of the cylindrical surfaces of the outer circumference (the tape path guide) in the lower drum 11, upper drum 12, and inner drum 13 are set all the same, or in accordance with the relation d2>d3>d1.

With the above construction, it is possible to suppress the surface area and the thickness of the tape path, but the following problems are created.

That is, as the tape 31 is wound around the rotary head drum 1, as shown in a sectional view of a floating condition in FIGS. 11(a)–(b), air is included between the tape 31 and the inner drum 13 along with rotation of the inner drum 13 by the viscous resistance of air, and the floating height reaches a maximum on the inner drum 13, and then declines sequentially on the lower drum 11 and upper drum 12. The floating height is almost zero micron on the upper drum, more than ten microns on the inner drum, and several microns on the lower drum. Thus, when the diameter of the upper drum 12 is equal to or larger than the diameter of the inner drum 13, the tape 31 is always in contact with the upper drum 12.

In such a state, the frictional force between the tape 31 and the upper drum 12 is large, and the tape tension increment after installation of the rotary head drum is large, and hence the tape running load increases, thereby leading to tape damage, or slip generation at capstan 72, or increased motor current.

The tape 31 is often coated with a surface treating agent such as lubricant on both sides in order to improve the running performance. However, in the running state in which the tape 31 is in contact with the upper drum 12, since a machining tool path in a direction vertical to the axial center is formed on the outer circumference of the upper drum 12, the surface treating agent on the magnetic surface side, and other sub-micron dust particles in the appliance or deposits on the tape may collect along the machining tool path and be deposited on the upper drum 12. As a result, the tape running resistance may be increased, or in a worst case, sticking may occur between the tape 31 and the upper drum 12 or inner drum 13, and tape running may be disabled, or the magnetic layer may be peeled away from the base film of the tape 31.

SUMMARY OF THE INVENTION

To solve the above problems, the present invention includes a lower drum having a first tape path cylindrical surface for guiding a tape-form recording medium helically at a lead angle a, an upper drum having a second tape path cylindrical surface, and fixed oppositely and almost coaxially on the lower drum, and an inner drum having a third tape path cylindrical surface of nearly the same diameter as the first tape path cylindrical surface of the lower drum, rotatably supported almost coaxially between the upper drum and the lower drum, and having a rotary head, in which the second tape path cylindrical surface of the upper drum is at the inner side of the first tape path cylindrical surface of the lower drum in a range of winding of the tape-form recording medium on the upper drum.

The present invention also includes a lower drum having a first tape path cylindrical surface for guiding a tape-form recording medium helically at a lead angle a, an upper drum having a second tape path cylindrical surface of nearly the same diameter as the first tape path cylindrical surface of the lower drum, and fixed oppositely and almost coaxially on the lower drum, and an inner drum having a third tape path cylindrical surface, rotatably supported almost coaxially between the upper drum and the lower drum, and having a rotary head, in which the third tape path cylindrical surface of the inner drum is at the outer side of the first and second tape path cylindrical surfaces in a range of winding of the tape-form recording medium.

Thus, according to the rotary head drum of the present invention, since contact with the tape on the upper drum is restricted, the tape running load is reduced, and it is possible to prevent tape damage, slip on the capstan, and increased motor current.

The present invention is a rotary head drum comprising a lower drum having a first tape path cylindrical surface for guiding a tape-form recording medium helically at a lead angle a, an upper drum having a second tape path cylindrical surface, and being fixed oppositely and almost coaxially on the lower drum, and an inner drum having a third tape path cylindrical surface of nearly the same diameter as the first tape path cylindrical surface of the lower drum, rotatably supported almost coaxially between the upper drum and the lower drum, and having a rotary head, in which the second tape path cylindrical surface of the upper drum is at the inner side of the first tape path cylindrical surface of the lower drum in a range of winding of the tape-form recording medium on the upper drum. Therefore, since contact with the tape on the upper drum is restricted, the tape running load is reduced, thereby preventing tape damage, slip on the capstan, and increased motor current.

DETAILED DESCRIPTION OF THE INVENTION

A first embodiment of the invention is described below with reference to the drawings. Explanation of parts which are the same as parts in the prior art is omitted.

Figure 1:
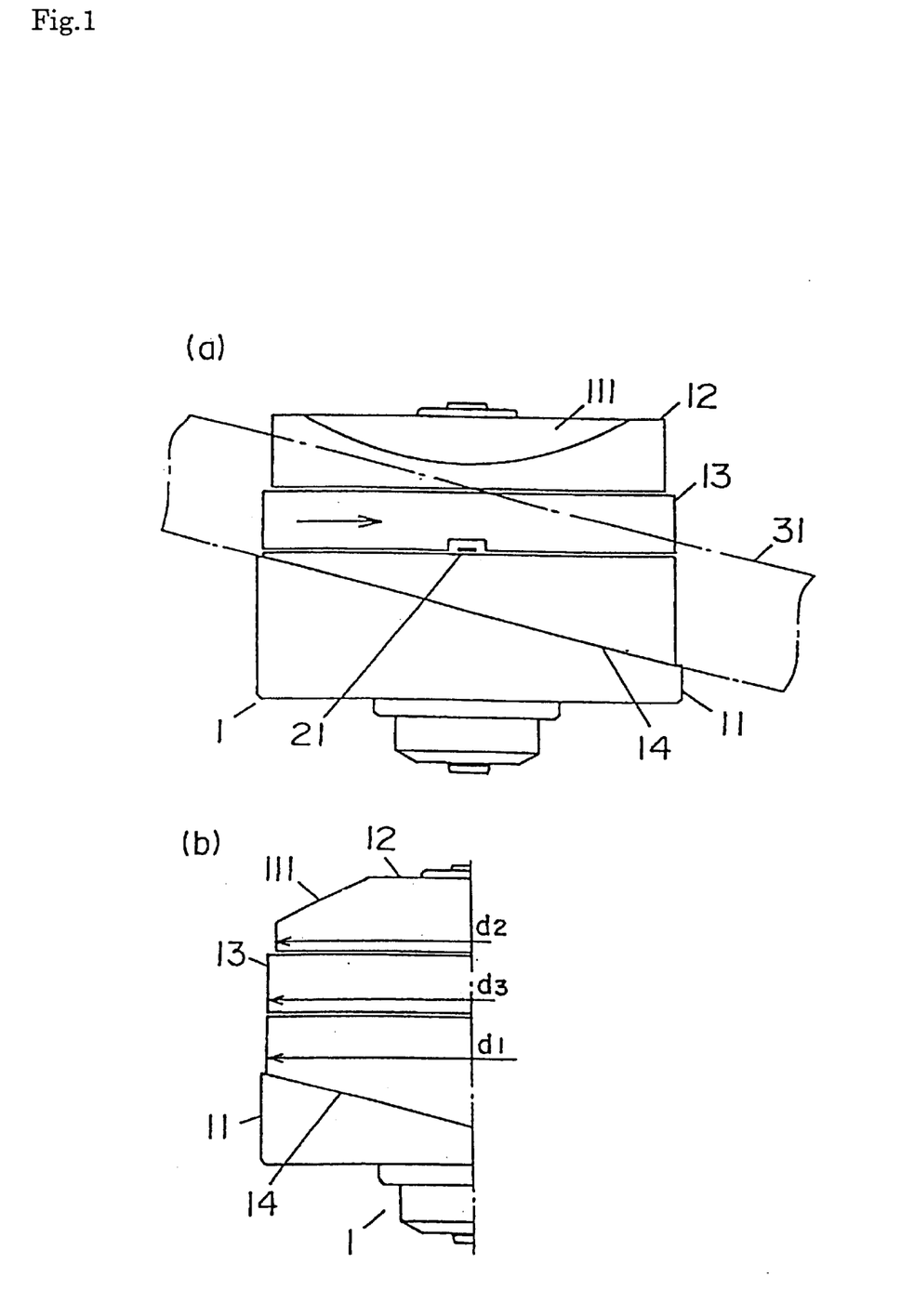
FIG. 1(a) is a side view of a rotary head drum in a first embodiment of the invention.
FIG. 1(b) is a side view showing the diameter of each drum of the rotary head drum in the first embodiment of the invention.

FIG. 1 is a side view of a rotary head drum 1 constructed in accordance with the first embodiment. The rotary head drum 1 includes an upper drum 12, an inner drum 13, and a lower drum 11 which are mutually disposed coaxially. A tape path cylindrical part of the inner drum 13 has a thickness of ¼ to ¾ of the width of a tape 31. Herein, as shown in FIG. 1(b), the diameter d2 of the upper drum 12 is smaller than the diameters d1, d3 of the lower drum 11 and inner drum 13 by several microns.

The operation of the rotary head drum is described below. FIG. 4(a) shows the floating height of the tape 31 when the inner drum 13 is rotated by winding the tape 31 helically around the rotary head drum 1 in the first embodiment. As shown, the floating height of the tape 31 is the largest on the inner drum 13. Herein, floating of more than ten microns is noted.

Also, with respect to the lower drum 11, the tape 31 floats by about several microns which is the same as in the prior art. Also on the upper drum 12, the tape floats by about zero to several microns which is different from the prior art. The floating height on the upper drum 12 is zero microns, i.e. the tape 31 contacts the upper drum 12 only when the tape tension is temporarily high at a time of mode transfer or the like.

Thus, in this embodiment, since the diameter d2 of the upper drum 12 is smaller than the diameters d1, d3 of the lower drum 11 and inner drum 13, respectively, the tape 31 usually floats above the upper drum 12, and frictional sliding between the upper drum 12 and tape 31 does not occur, and the running frictional resistance of the tape 31 will not be increased. If the tension is temporarily abnormally increased at the time of mode transfer or the like to cause the upper drum 12 to contact the tape 31, the surface pressure of the tape 31 on the upper drum 12 is small, so that the running frictional resistance is small.

Incidentally, when the diameter of the rotary head drum 1 is within a range of 10 mm to 80 mm, as long as the diameter difference of the diameters d1, d3 of the lower drum 11 and the inner drum 13 and the diameter d2 of the upper drum is approximately 10 microns or more, the upper drum 12 will not contact the tape 31 even in the state of high tension at the time of mode transfer or the like.

However, if the diameter difference of the diameters d1, d3 of the lower drum 11 and inner drum 13 and the diameter d2 of the upper drum 12 is too large, the tape 31 may ride over the upper drum 12 and be dislocated. When loading the tape 31 on the tape path. In such a state, the tape 31 may become entangled, and the cassette 2 cannot be removed from the deck. To prevent such inconvenience, the diameter difference of the diameters d1, d3 of the lower drum 11 and inner drum 13 and the diameter d2 of the upper drum 12 should within 30 microns. Therefore, if the tape 31 is about to ride over the upper drum 12, its complete riding-over can be prevented by the frictional force between the tape 31 and the upper drum 12.

If the diameter difference is within 20 microns, adverse effects on the linearity of the track to be recorded by the head 21 can be almost completely ignored.

Figure 5:
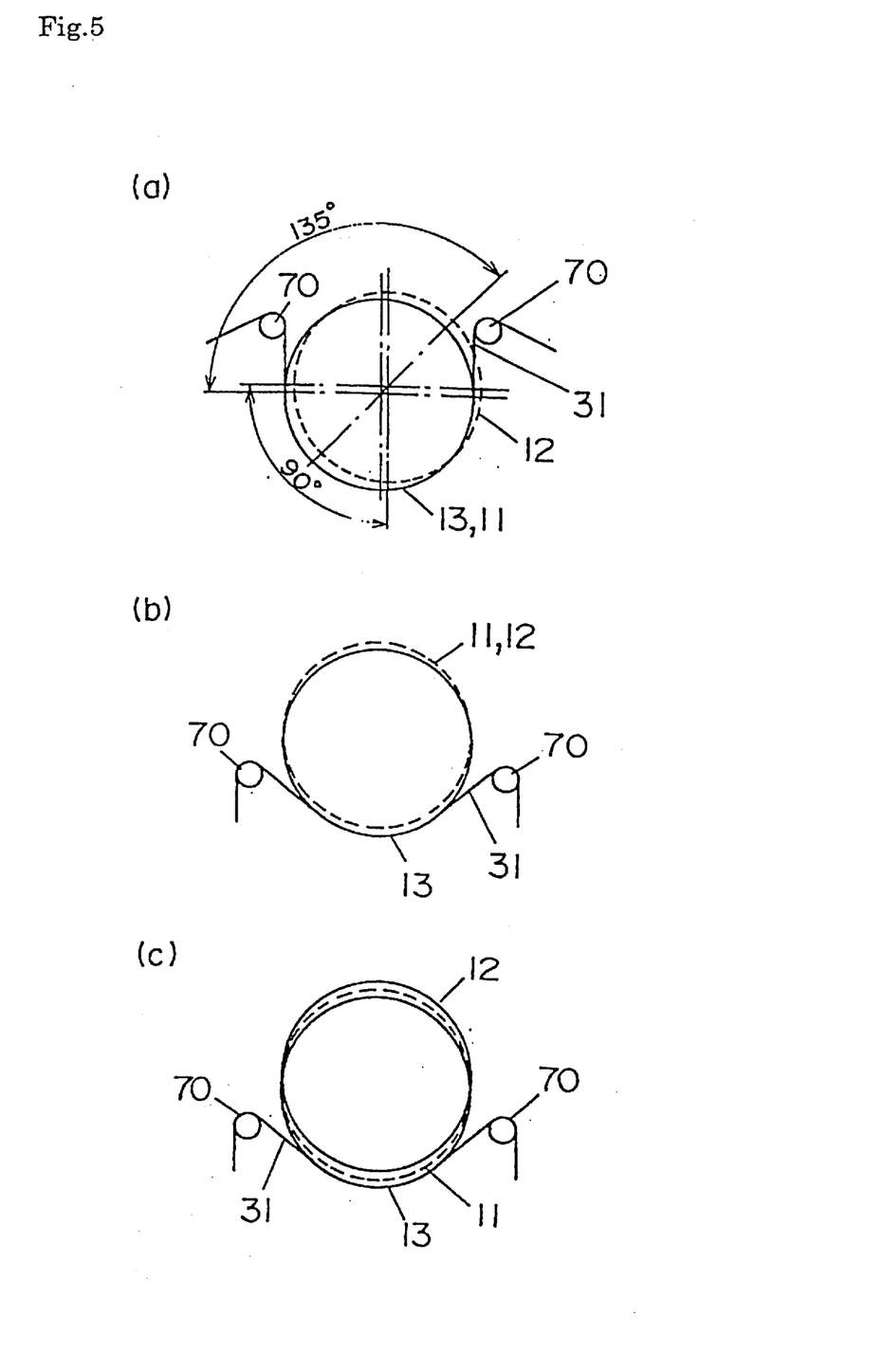
FIG. 5(a) is a plan view showing an eccentric configuration of the upper, inner, and lower drums in the first embodiment of the invention.
FIG. 5(b) is a plan view showing an eccentric configuration of the upper, inner, and lower drums in the second embodiment of the invention.
FIG. 5(c) is a plan view showing an eccentric configuration of the upper, inner, and lower drums in the third embodiment of the invention.

In the embodiment, the lower drum 11, upper drum 12, and inner drum 13 are mutually disposed coaxially and are different in diameter from each other. Therefore, the tape path cylindrical surface of the upper drum 12 is smaller in the diameter direction relative to the tape path cylindrical surface of the lower drum 11. However, as shown in FIG. 5(a), the upper drum 12 may be eccentric to the lower drum 11 and inner drum 13, and the lower drum 11, upper drum 12 and inner drum 13 may be identical in diameter. In such a case, the tape 31 is wound around the rotary head drum 1 by about 180 degrees by means of a loading post 70, and the thickness of the inner drum 13 is about ½ of the width of the tape 31. Therefore, the tape 31 is wound around the upper drum 12 in a range of about 90 degrees. Therefore, the eccentric direction of the upper drum 12 deviates in the opposite direction (135 degrees in the diagram) from the winding center of the tape 31 on the upper drum 12.

In such a construction, the same effects as in the above embodiment are obtained. Moreover, since the lower drum 11, upper drum 12, and inner drum 13 have the same diameters, the dimension measuring gauge is uniform, and the process control is simplified.

Figure 2:
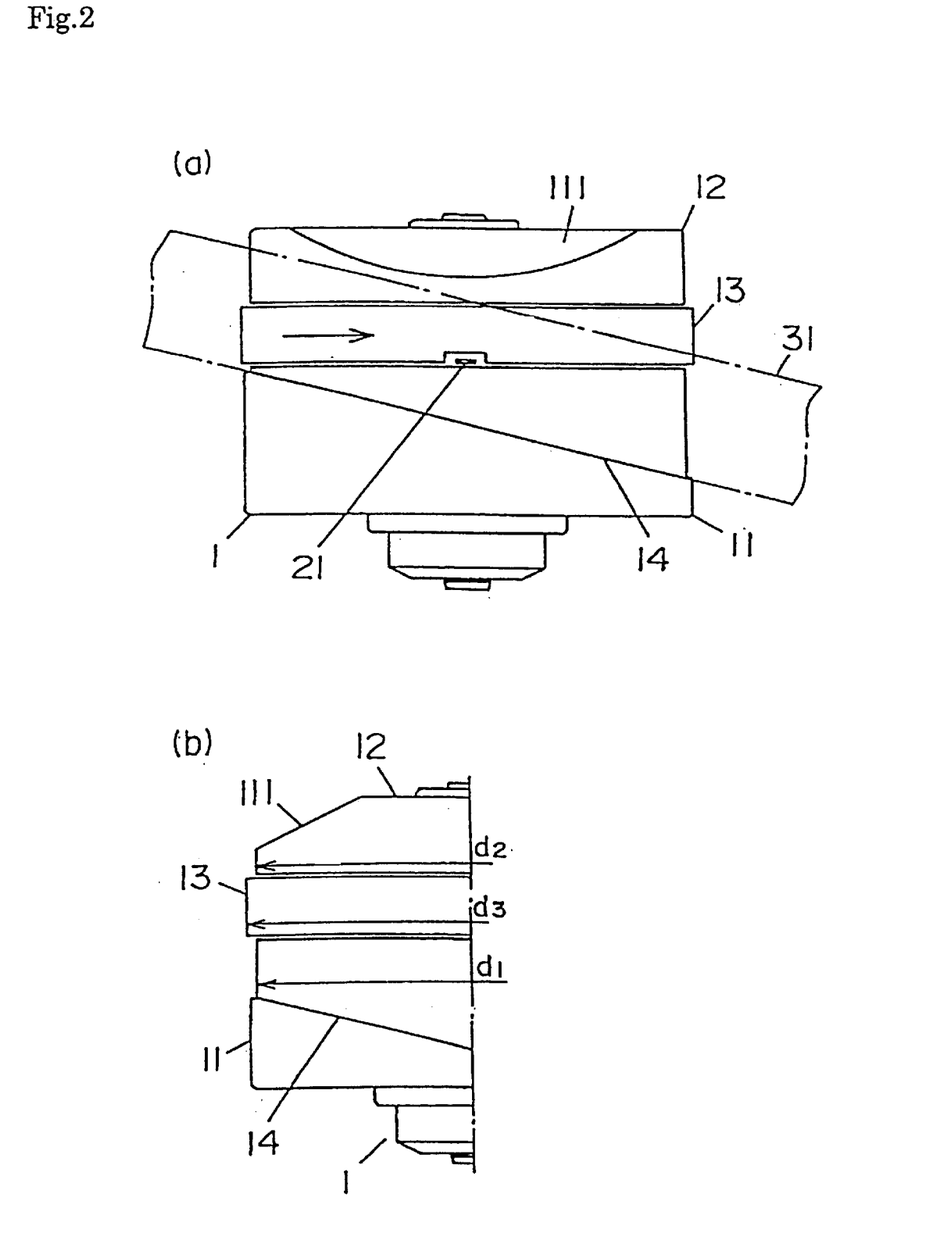
FIG. 2(a) is a side view of a rotary head drum in a second embodiment of the invention.
FIG. 2(b) is a side view showing the diameter of each drum of the rotary head drum in the second embodiment of the invention.

A second embodiment of the present invention is described with reference to the drawings. FIG. 2(a) is a side view of the rotary head drum in this embodiment. An upper drum 12, an inner drum 13, and a lower drum 11 are mutually disposed coaxially. The tape path cylindrical part of the inner drum 13 has a thickness of ¼ to ¾ of the width of the tape 31. As shown in FIG. 2(b), the diameter d3 of the inner drum 13 is larger than the diameters d1, d2 of the lower drum 11 and upper drum 12 by several microns.

The operation of the second embodiment is described below. FIG. 4(b) shows the floating height of the tape 31 when the inner drum 13 is rotated by winding the tape 31 helically around the rotary head drum 1 of the second embodiment. As shown in the diagram, the floating height of the tape 31 is the largest on the inner drum 13. Floating of more than ten microns is noted at the inner drum 13. On the lower drum 11, the tape floats more than in the prior art devices. Also on the upper drum 12, the tape floats by about zero to several microns. It is only when the tension is temporarily high, at the time of mode transfer or the like, that the floating height on the upper drum 12 is zero microns, i.e. the tape 31 contacts the upper drum 12.

Thus, in the second embodiment, since the diameter d3 of the inner drum 13 is larger than the diameters d1, d2 of the lower drum 11 and upper drum 12, the tape 31 will usually float also above the upper drum 12, and frictional sliding of the upper drum 12 and tape 31l will not occur, and thus the running frictional resistance of the tape 31 will not be increased. If the tension is abnormally increased temporarily at the time of mode transfer or the like to cause the upper drum 12 to contact the tape 31, the surface pressure of the tape 31 on the upper drum 12 is small, so that the running frictional resistance is small.

Incidentally, when the diameter of the rotary head drum 1 is in a range of 10 mm to 80 mm, as long as the diameter difference of the diameters d1, d2 of the lower drum 11 and upper drum 12 and the diameter d3 of the inner drum is about 10 microns or more, the upper drum 12 does not contact the tape 31 even during a state of high tension at the time of mode transfer or the like.

However, when loading the tape 31 on the tape path, in case of improper setting of loading route, the tape 31 may ride over the upper drum 12 and be dislocated if the diameter difference of the diameters d1, d2 of the lower drum 11 and upper drum 12 and the diameter d3 of the inner drum 13 is too large. In such a state, the tape 31 may become entangled, and the cassette 2 cannot be removed from the deck. To prevent such an inconvenience, the diameter difference of the diameters d1, d2 of the lower drum 11 and upper drum 12 and the diameter d3 of the inner drum 13 should be set within 40 microns. Therefore, if the tape 31 is about to ride over the upper drum 12, its complete riding-over can be prevented by the frictional force between the tape 31 and the upper drum 12.

If the diameter difference is within 20 microns, adverse effects on linearity of the track to be recorded by the head 21 can be almost completely ignored.

In the second embodiment, the lower drum 11, upper drum 12, and inner drum 13 are mutually disposed coaxially and are different in diameter from each other, and therefore the tape path cylindrical surface of the inner drum 13 is larger in the diameter direction relative to the tape path cylindrical surface of the lower drum 11 and upper drum 12. However, in the case of the tape path for winding the tape 31 about 90 degrees around the rotary head drum 1, as shown in FIG. 5(b), the inner drum 13 may be eccentric relative to the lower drum 11 and upper drum 12, and the lower drum 11, upper drum 12 and inner drum 13 may be identical in diameter. In such a case, the eccentric direction of the inner drum 13 is deviated or shifted in the winding center direction of the tape 31.

In such a construction, the same effects as in the above embodiment are obtained. Moreover, since the lower drum 11, upper drum 12, and inner drum 13 have the same diameters, the dimension measuring gauge is uniform, and the process control is simplified.

Figure 3:
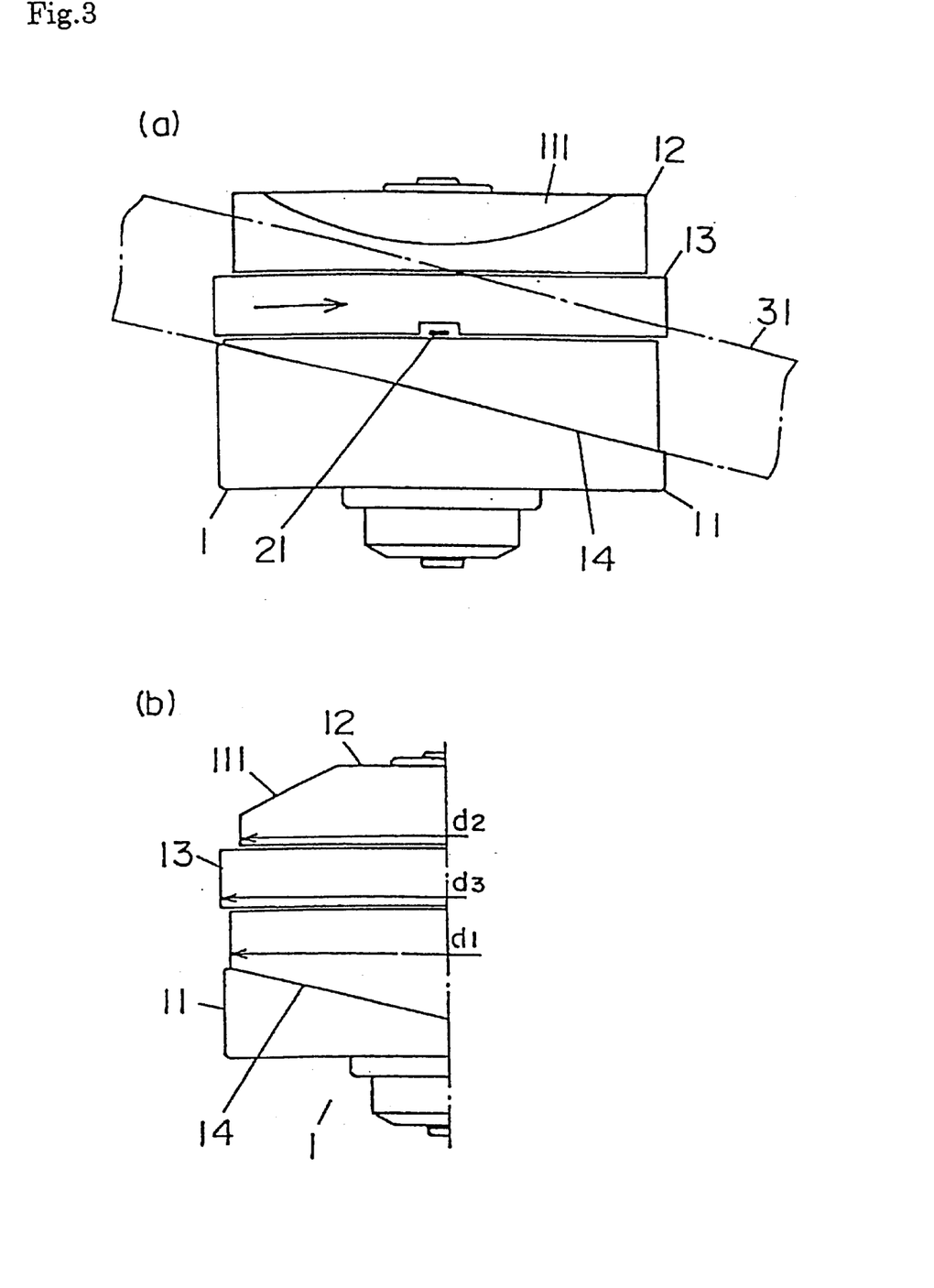
FIG. 3(a) is a side view of a rotary head drum in a third embodiment of the invention.
FIG. 3(b) is a side view showing the diameter of each drum of the rotary head drum in the third embodiment of the invention.

A third embodiment of the invention is described with reference to the drawings. FIG. 3(a) is a side view of the rotary head drum in the third embodiment. An upper drum 12, an inner drum 13, and a lower drum 11 are mutually disposed coaxially. The tape path cylindrical part of the inner drum 13 has a thickness of ¼ to ¾ of the width of the tape 31. As shown in FIG. 3(b), the diameter dl of the lower drum 11, diameter d2 of the upper drum 12, and the diameter d3 of the inner drum 13 are set in accordance with the relation d3>d1>d2, and the diameter difference is several microns each. That is, the inner drum 13 has the largest diameter, and the upper drum 12 has the smallest diameter.

The operation of the third embodiment is described below. FIG. 4(c) shows the floating height of the tape 31 when the inner drum 13 is rotated by winding the tape 31 helically around the rotary head drum 1. As shown in the diagram, the floating height of the tape 31 is largest on the inner drum 13. At the inner drum 13, floating of more than ten microns is noted. On the lower drum 11, the tape 31 floats more than in the prior art device. Also on the upper drum 12, the tape 31 floats by several microns. In the third embodiment, since the tape 31 floats sufficiently even on the upper drum 12, the upper drum 12 does not contact the tape 31 even when the tension is temporarily high at the time of mode transfer or the like.

Thus, in this embodiment, since the diameter d3 of the inner drum 13 is larger than the diameters d1, d2 of the lower drum 11 and upper drum 12, the tape 31 usually floats also above the upper drum 12, and frictional sliding of the upper drum 12 and tape 31 does not occur, and the running frictional resistance of the tape 31 will not be increased. If the tension is abnormally increased temporarily at the time of mode transfer or the like, the upper drum 12 will not contact the tape 31, so that an increase of the running frictional resistance is prevented.

Incidentally, when the diameter of the rotary head drum 1 is in a range of 10 mm to 80 mm, as long as the diameter difference of the diameter d2 of the upper drum 12 and the diameter d3 of the inner drum is about 10 microns or more, the upper drum 12 does not contact the tape 31 even in a state of high tension at the time of mode transfer or the like.

However, in a case of improper setting of the loading route, the tape 31 may ride over the upper drum 12 and become dislocated if the diameter difference of the diameter d2 of the upper drum 12 and the diameter d3 of the inner drum 13 is too large, when loading the tape 31 on the tape path. In such a state, the tape 31 may become entangled, and the cassette 2 cannot be removed from the deck. To prevent such an inconvenience, the diameter differences of the diameter d2 of the upper drum 12 and the diameter d3 of the inner drum 13 should be set to within 40 microns. Therefore, if the tape 31 is about to ride over the upper drum 12, its complete riding-over can be prevented by the frictional force between the tape 31 and the upper drum 12.

If the diameter difference is within 20 microns, adverse effects on linearity of the track to be recorded by the head 21 can be almost completely ignored.

In the third embodiment, the lower drum 11, upper drum 12, and inner drum 13 are mutually disposed coaxially and are different in diameter from each other, and therefore the tape path cylindrical surface of the inner drum 13 is larger in the diameter direction in relation to the tape path cylindrical surface of the lower drum 11. Also, the tape path cylindrical surface of the upper drum 12 is smaller in the diameter direction in relation to the tape path cylindrical surface of the lower drum 11. However, in the case of the tape path for winding the tape 31 about 90 degrees around the rotary head drum 1, as shown in FIG. 5(c), the inner drum 13 and upper drum 12 may be eccentric to the lower drum 11, and the lower drum 11, upper drum 12 and inner drum 13 may be identical in diameter. In such a case, the eccentric direction of the inner drum 13 deviates in the winding center direction of the tape 31. The eccentric direction of the upper drum 12 is in the opposite direction relative to the inner drum 13.

In such a construction, the same effects as in the above embodiment are obtained. Moreover, since the lower drum 11, upper drum 12, and inner drum 13 have the same diameters, the dimension measuring gauge is uniform, and the process control is simplified.

Figure 6:
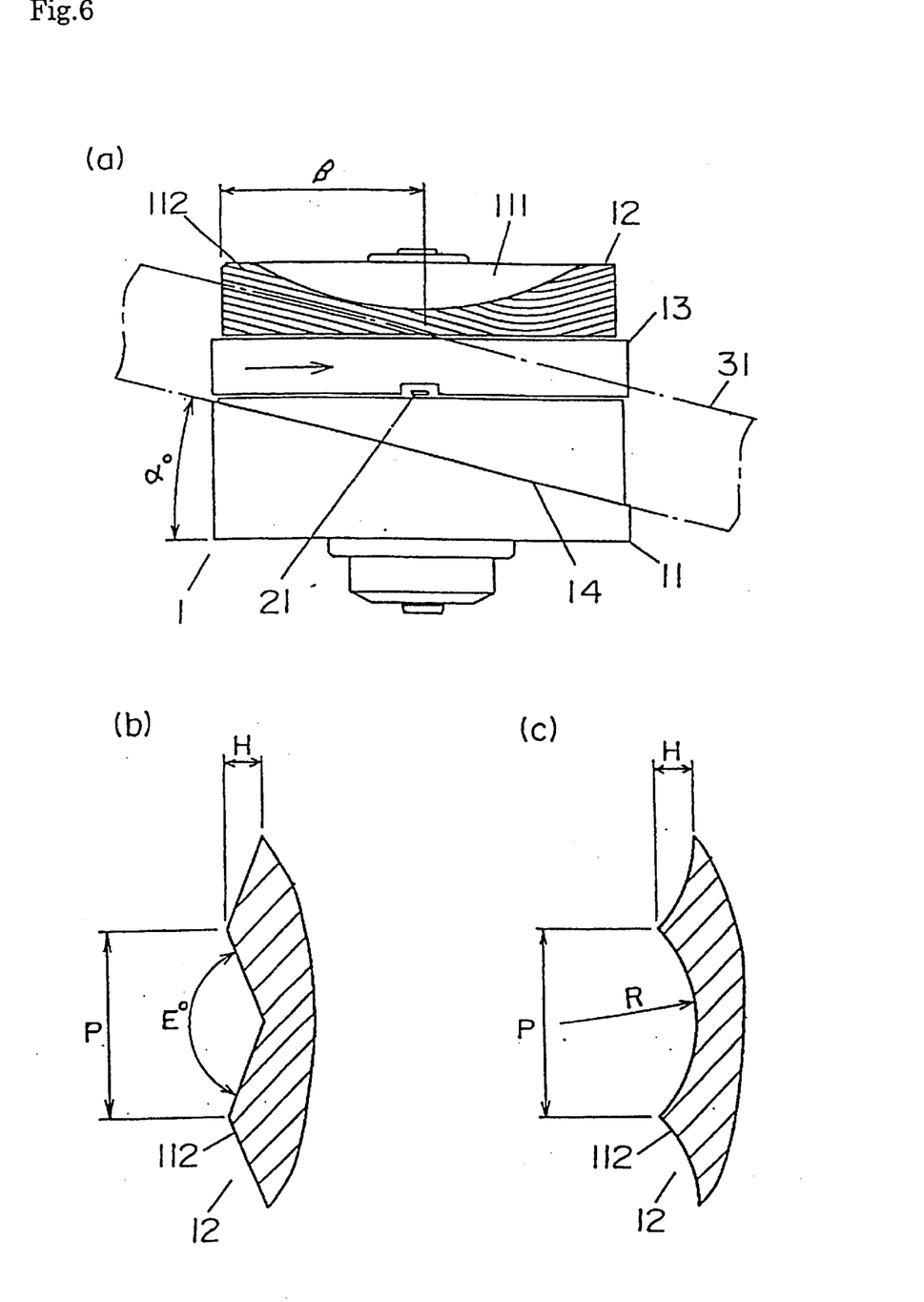
FIG. 6(a) is a side view of a rotary head drum in a fourth embodiment of the invention.
FIG. 6(b) is a sectional view of essential parts of an upper drum in an example of machining in the fourth embodiment of the invention.
FIG. 6(c) is a sectional view of essential parts of the upper drum in another example of machining in the fourth embodiment of the invention.

A fourth embodiment of the invention is described with reference to FIG. 6. As shown in FIG. 6(a), in a rotary head drum 1, a tape 31 is running as being wound at a lead angle of α degrees along a lead 14 provided in a lower drum 11. The thickness of an inner drum 13 is about half of the width of the tape 31. In the fourth embodiment, the diameters of the lower drum 11, upper drum 12, and inner drum 13 are the same as in the first or second embodiments.

Moreover, on the upper drum 12, in a range β of winding of the tape 31, a machining tool path 112 is provided at nearly the same angle as the lead angle α.

The machining tool path 112 is, as shown in FIG. 6(b) and FIG. 6(c), a corrugated form at a processing pitch of $P \geq 30$ microns, and a corrugation height of $H \geq 1$ micron. FIG. 6(b) shows machining by a tool having an obtuse angle E° in the tip nose shape, and FIG. 6(c) shows machining by a tool having an arc form of radius R in the tip nose shape.

The operation of the fourth embodiment is described below. The tape 31 is generally coated with surface treating agent such as lubricant on both sides for improving the running performance of the tape. Herein, if the tape 31 runs while contacting with the upper drum 12, as in the prior art, since there is a machining tool path in a direction vertical relative to the axial center on the outer circumference of the upper drum 12, while the tape 31 runs obliquely by the lead angle a to this machining tool path, the surface treating agent on the magnetic surface side, and dust and magnetic powder are collected by the machining tool path as if shaved by a razor, and is deposited on the upper drum 12.

Further, due to the surface treating agent and dust collected on the upper drum 12, when the tape 31 is left wound around the rotary head drum 1 for a long period of time, the tape 31 and upper drum 12 will stick to each other, and tape damage will occur.

In each of the embodiments of the invention, if the tension becomes high, the upper drum 12 and tape 31 will contact with each other, but when creased or damage tape is loaded, the air film on the inner drum 13 is broken, and the floating height is decreased. In such an extreme running state, the tape 31 may contact the upper drum 12, and the surface treating agent or dust may be deposited on the upper drum 12. Also, if left in a contacting state for a long period of time, the tape 31 and upper drum 12 may stick to each other.

On the other hand, according to the fourth embodiment, since the machining tool path 112 is parallel to the running direction of the tape 31, and is in a corrugated form at a processing pitch of $P \geq 30$ microns, and corrugation height of $H \geq 1$ micron, if the upper drum 12 and tape 31 contact, the surface treating agent or dust will not be collected and deposited on the upper drum 12, so that sticking will not occur.

Meanwhile, since the tape 31 contacts only in the peak area of the machining tool path 112, the actual contact area is small, and the direction of the machining tool path 112 is nearly parallel to the running direction of the tape 31, and thus the surface treating agent or the like will not be collected. However, if the corrugation height H is too low or the processing pitch P is too small, the actual contact area begins to increase. As a result, if the machining tool path 112 is parallel to the running direction of the tape 31, the surface treating agent on the tape 31 will be collected by cohesion, and deposits on the upper drum 12 will cause sticking. Therefore, the machining surface requires a certain roughness. As limit values were determined in various tapes, it was confirmed that deposition will not occur at a processing pitch of P≧30 microns, and a corrugation height H≧1 micron.

If the processing pitch is too large, vibration of the machining tool increases, and hence the precision of the processing dimension deteriorates. In the case of machining of an aluminum bar of 10 to 80 mm in diameter, the required machining precision in the micron order for the rotary head drum is assured at a processing pitch P of 120 microns or less.

If the corrugation height H is too large, the tool life is shorter and marks of the machining tool path 112 is transferred. Though variable with the tape, such inconvenience does not occur at 6 microns or less.

Therefore, according to the fourth embodiment, if a damaged tape 31 is loaded, it is possible to prevent sticking due to deposits of surface treating agent or dust on the tape 31.

Figure 4:
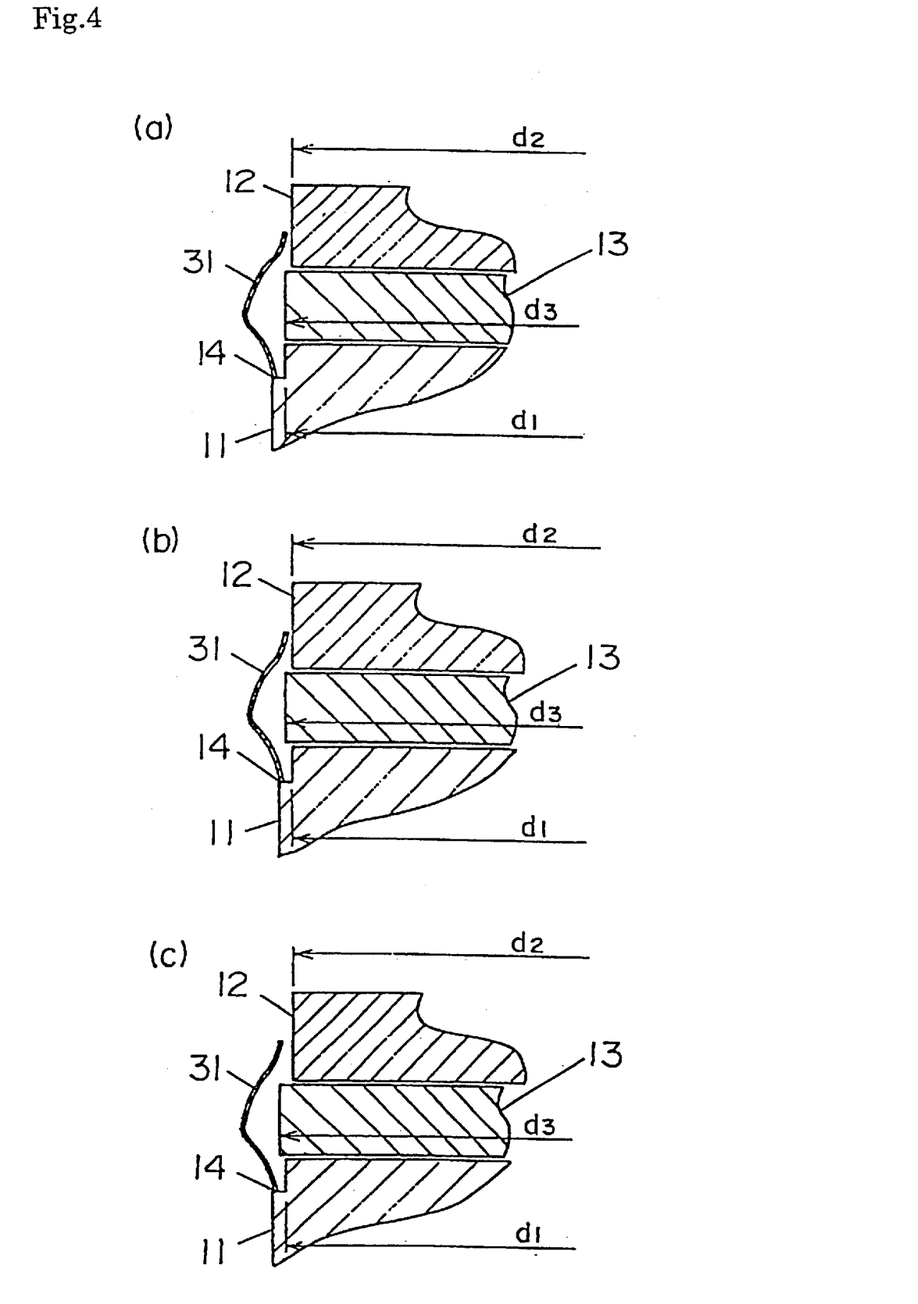
FIG. 4(a) is an explanatory diagram of tape floating condition in relation to upper, inner, and lower drums in the first embodiment of the invention.
FIG. 4(b) is an explanatory diagram of tape floating condition in relation to upper, inner, and lower drums in the second embodiment of the invention.
FIG. 4(c) is an explanatory diagram of tape floating condition in relation to upper, inner, and lower drums in the third embodiment of the invention.
Figure 7:
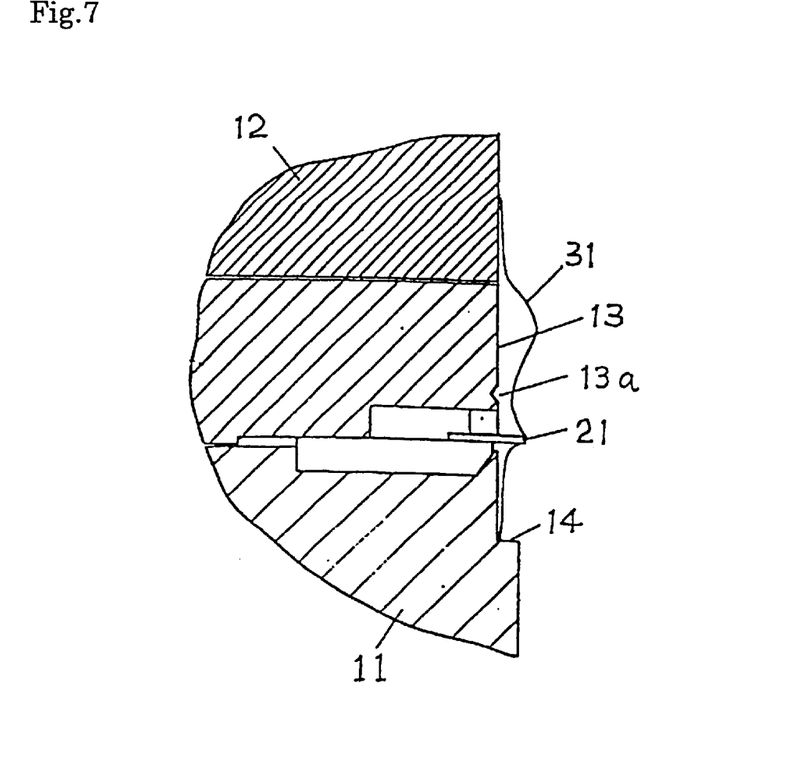
FIG. 7 is a partial sectional view showing a floating height of a magnetic tape in a fifth embodiment of the invention.
Figure 8:
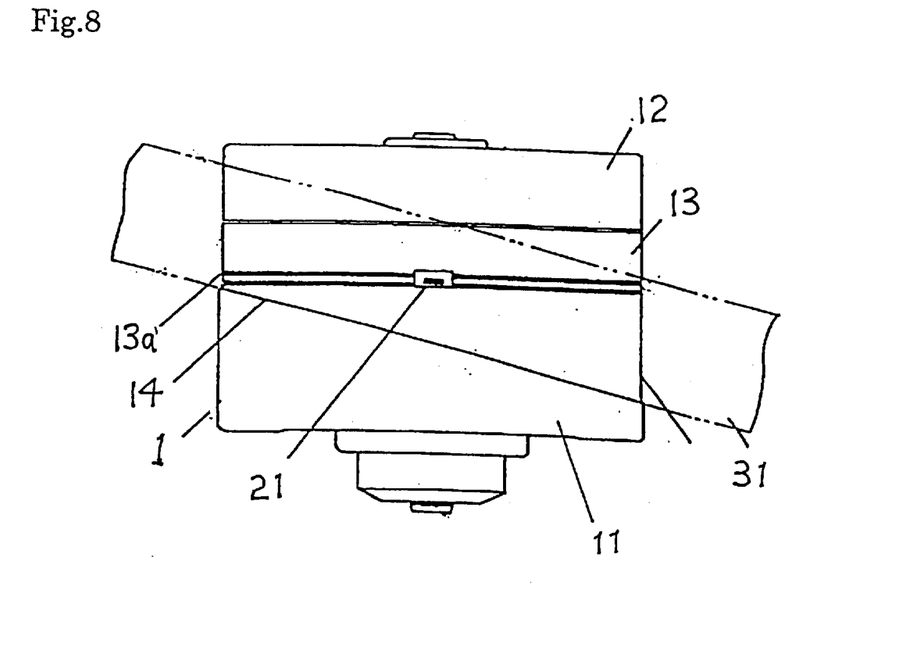
FIG. 8 is a front view of a rotary head drum in the fifth embodiment of the invention in which a groove is positioned within the region of a head window.

A fifth embodiment of the invention is described with reference to FIG. 7 of the drawings. As shown in FIG. 4, an air film is formed on the outer circumference of the inner drum while rotating at a high speed. The air film floats the tape and contributes to decrease of load. However, if floating is excessive, the contact between the head and tape is uncertain, and recording and reproducing may be inaccurate. In FIG. 7, by forming a V-shaped groove 13a near the head mounting surface, the floating height near the head 21 is decreased, and the contact between the head 21 and tape 31 is improved. FIG. 8 is a side view of a rotary head drum of the fifth embodiment.

Incidentally, since the groove sectional shape is a V-form, the shape is determined by the peak angle of the tool used and the groove width.

Figure 9:
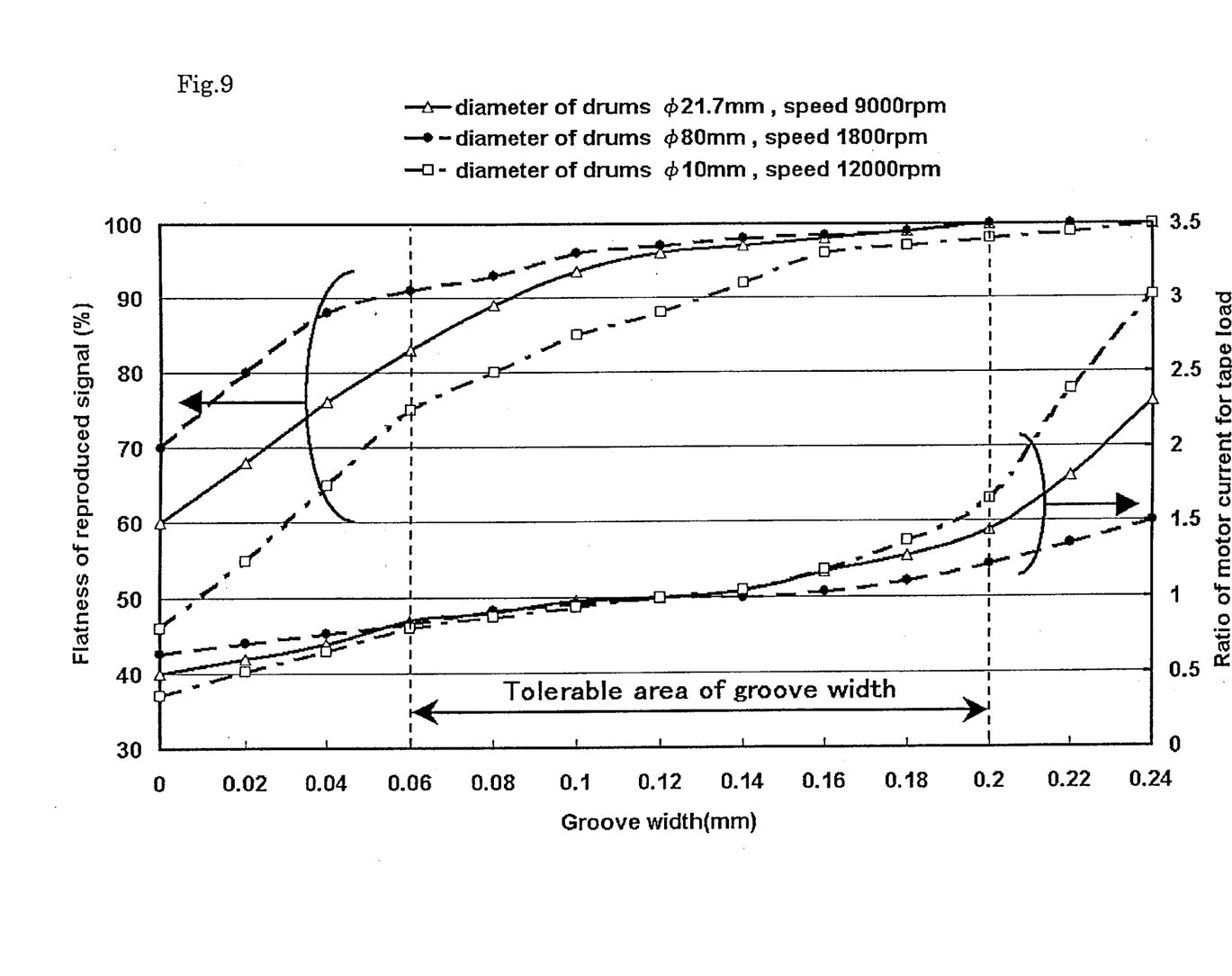
FIG. 9 is a graph showing the relation of changes of flatness of reproduction output in terms of groove width and tape load current in the fifth embodiment of the invention.

FIG. 9 is a graph showing changes of the groove width depending on the reproduction output and the tape load current on the drum. The graph shows the results of an experiment for determining the best range of groove width. As understood from the diagram, in spite of large changes of both diameter and rotating speed, by setting the groove width in a range of 0.06 to 0.2 mm, a secure head touch is realized while lessening the tape load.

Thus, according to the rotary head drum of the invention, in the range of winding of the tape-form recording medium on the upper drum, the tape path cylindrical surface of the upper drum is set at the inner side from the tape path cylindrical surface of the lower drum. Therefore, the tape does not contact the upper drum, and increased frictional resistance between the tape and upper drum is restricted, and the tape running load is suppressed, thereby preventing occurrence of tape damage, occurrence of slip on the capstan, and increased motor current.

According to the rotary head drum of the present invention, in the range of winding of the tape-form recording medium, since the tape path cylindrical surface of the inner drum is at the outer side relative to the upper and lower drums, the tape does not contact the upper drum, and thus increased frictional resistance between the tape and the upper drum is restricted. Also, the tape running load is suppressed, thereby preventing occurrence of tape damage, occurrence of slip on the capstan, and increased motor current.

What is claimed is:

1. A rotary head drum assembly comprising:

a lower drum having a first tape path cylindrical surface for guiding a tape-form recording medium helically at a lead angle;

an upper drum having a second tape path cylindrical surface, said upper drum being fixed oppositely with respect to said lower drum;

an inner drum having a third tape path cylindrical surface for the tape-form recording medium, said inner drum being rotatably supported approximately coaxially between said upper drum and said lower drum, wherein the thickness, in the axial direction, of said third tape path cylindrical surface of said inner drum is ¼ to ¾ of the tape width; and a rotary head mounted on said inner drum, wherein said third tape path cylindrical surface of said inner drum is positioned radially outwardly relative to said first and second tape path cylindrical surfaces, wherein said second tape path cylindrical surface of said upper drum is positioned at an inner side of said first tape path cylindrical surface of said lower drum, and wherein said lower drum, said upper drum and said inner drum are coaxially aligned.

2. A rotary head drum assembly as claimed in claim 1, wherein said upper drum is provided with a corrugated surface.

3. A rotary head drum assembly as claimed in claim 1, wherein said upper drum is provided with a plurality of grooves extending along a direction that is substantially parallel to a running direction of the tape-form recording medium.

4. A rotary head drum assembly as claimed in claim 1, wherein said upper drum is provided with at least one V-shaped groove.

5. A rotary head drum assembly as claimed in claim 1, wherein said upper drum is provided with at least one arcuate groove.

* * * * *